(12) United States Patent
Marques et al.

(10) Patent No.: US 11,677,348 B2
(45) Date of Patent: Jun. 13, 2023

(54) SAFETY BUS IN AN INDUSTRIAL DEVICE ASSEMBLY

(71) Applicant: Rockwell Automation Technologies, Inc., Mayfield Heights, OH (US)

(72) Inventors: Roberto S. Marques, Cedarburg, WI (US); Calvin Steinweg, Hartford, WI (US); James K. Newbern, Slinger, WI (US); Robert Dilgard, Shorewood, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/446,524

(22) Filed: Aug. 31, 2021

(65) Prior Publication Data

US 2023/0066880 A1 Mar. 2, 2023

(51) Int. Cl.
*H02P 29/024* (2016.01)
*H02K 11/30* (2016.01)

(52) U.S. Cl.
CPC ............ *H02P 29/024* (2013.01); *H02K 11/30* (2016.01)

(58) Field of Classification Search
CPC .............................. H02P 29/024; H02K 11/30
See application file for complete search history.

(56) References Cited

U.S. PATENT DOCUMENTS

| | | | | |
|---|---|---|---|---|
| 9,841,142 | B2* | 12/2017 | Nair | G05B 9/02 |
| 10,318,772 | B1* | 6/2019 | Steinweg | G05B 19/042 |
| 2010/0085677 | A1* | 4/2010 | Rivers, Jr. | G05B 19/0423 361/172 |
| 2015/0357946 | A1* | 12/2015 | Farr | H02P 27/06 318/400.3 |
| 2018/0083513 | A1* | 3/2018 | Pharne | H05K 7/1414 |
| 2019/0340269 | A1* | 11/2019 | Biernat | H04L 9/50 |

* cited by examiner

*Primary Examiner* — Rina I Duda
(74) *Attorney, Agent, or Firm* — Fletcher Yoder, P.C.

(57) ABSTRACT

A motor control center (MCC) for an industrial system includes a plurality of sections and a safety bus. Each section includes one or more units. Each unit includes one or more industrial control devices. The safety bus is configured to receive safety signals from a safety distribution unit and delivers the safety signals to each unit of the plurality of section.

20 Claims, 9 Drawing Sheets

SAFETY BUS IN AN INDUSTRIAL DEVICE ASSEMBLY

FIELD OF THE DISCLOSURE

The present disclosure relates to a safety bus for transmitting safety signals within an industrial device assembly, for example, a safety bus for transmitting safety signals within a motor control center (MCC).

BACKGROUND OF THE DISCLOSURE

Modern industrial automation systems often include one or more safety zones including one or more hazardous machine components that, if inappropriately breached, may cause injury to an operator. These safety zones can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards. To mitigate the risks associated with these hazardous machine components in the safety zones, safety systems are designed and used to protect operators who interact with the safety zones. "Safety" as used herein refers to the operation of specialized industrial control systems ("safety systems") used in environments where the safety of humans requires proper functioning of the control system. Safety systems may include the electronics associated with emergency-stop buttons, light curtains, and other machine lockouts. These safety systems often monitors the sates of various safety input devices, and disconnects power to the hazardous machine components if any of the safety input devices indicate a potentially unsafe condition.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to a motor control center (MCC) for an industrial system that includes a plurality of sections and a safety bus. Each section includes one or more units. Each unit includes one or more industrial control devices. The safety bus is configured to receive safety signals from a safety distribution unit and delivers the safety signals to each unit of the plurality of sections.

Some embodiments of the present invention relate to an industrial device assembly that includes a plurality of sections and a safety bus. Each section includes one or more units. Each unit includes one or more industrial control devices. The safety bus is configured to receive safety signals from a safety distribution unit and delivers the safety signals to each unit of the plurality of sections.

Some embodiments of the present invention relate to an industrial device assembly that includes a plurality of sections and a safety bus. Each section includes one or more units. Each unit includes one or more industrial control devices. The safety bus includes a plurality of safety taps connected via a single cable in series, each safety tap connected to a respective unit. A first safety tap of the plurality of safety taps is configured to receive safety signals from a safety distribution unit and delivers the safety signals to an adjacent safety tap and the corresponding unit.

Figure 1:
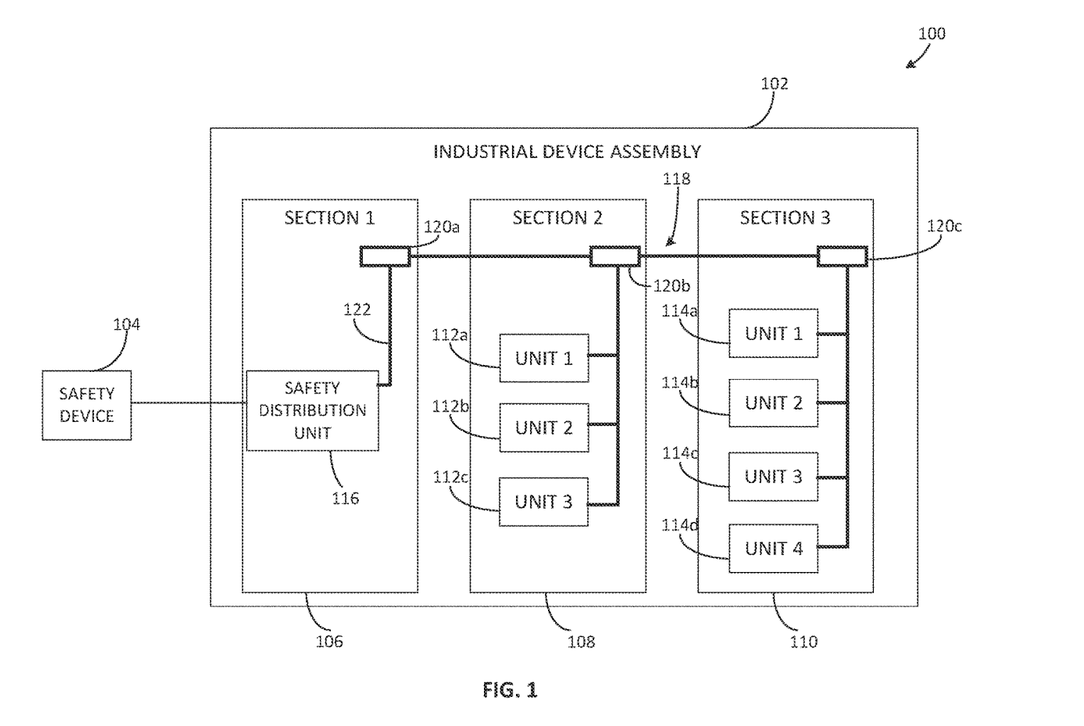
FIG. 1 shows a block diagram of an industrial safety system 100 according to an illustrative embodiment.

With reference to FIG. 1, a block diagram of an industrial safety system 100 is shown according to an illustrative embodiment. The industrial safety system 100 is configured to mitigate the risks of hazardous machine components within one or more safety zones according to the safety category 1 or category 2 defined by the industry-specific functional safety standards (e.g., defined by the International Organization for Standardization, or the International Electrotechnical Commission). The industrial safety system 100 includes one or more safety devices 104 and an industrial device assembly 102. The safety devices 104 include various devices that each has one or more contacts designed to close when the device is in a safe state, allowing a safety signal (e.g., 24 VDC signals) to pass and transmitting the safety signal to the industrial device assembly 102. The safety devices 104 include but not limited to proximity switches that determine when a safety gate is in the closed position, emergency stop pushbuttons, safety mats, light curtains, etc.

The industrial device assembly 102 may include various types of industrial device assemblies, such as motor control centers (MCCs), switchgear assemblies, and the like. The industrial device assembly 102 may be subdivided into one or more lineups, one or more sections within each lineup, and one or more units within each section. Each lineup may have 1 through N sections and each section may have 1 through M units. Each unit of the industrial device assembly 102 may contain one or more industrial automation devices that may include a component or a part that performs a specific operation for the industrial device assembly 102. Each section is associated with a safety zone including one or more hazardous machine components that, if inappropriately breached, may cause injury to an operator. For example, the industrial device assembly 102 includes a first section 106 that contains a safety distribution unit 116, a second section 108 that contains three units 112a, 112b, and 112c, and a third section 110 that contains four units 114a, 114b, 114c, and 114d. Each unit in the industrial device assembly 102 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) The section 1 106, section 2 108, and section 3 110 are associated with a same safety zone.

The industrial device assembly 102 further includes a safety bus 118 designed with a single channel 122 and configured to transmit safety signals to each unit within each section associated with the same safety zone. The safety bus 118 is connected to and receives safety signals from the safety distribution unit 116. The safety distribution unit 116 includes a safety relay configured to receive safety signals from the safety devices 104 and transmit the safety signals to the safety bus 118. The safety bus 118 includes a plurality of terminal blocks 120 and the single channel 122 connected between the terminal blocks 120 and corresponding units. The single channel 122 may include a single shielded cable that has two wires and a shield surrounding the two wires. The first wire carries a 24 VDC positive signal and the second wire carries a 24 VDC common signal. Each safety signal is transmitted within the single shielded cable by the 24 VDC positive signal and the 24 VDC common signal. The shield is used to reduce electrical noise from affecting the signals and reduce electromagnetic radiation. The terminal blocks 120 can be any suitable type of terminal blocks that is able to connect the single channel 122 and corresponding units. More details of the terminal blocks 120 will be provided in the following description of FIG. 8. For example, the terminal blocks 120 can be any Allen-Bradley Bulletin 1492 terminal blocks. Each terminal block is located in a respective section and connected to one or more units within the respective section. For example, a first terminal block 120a is located within the first section 106 and connected to the safety distribution unit 116, a second terminal block 120b is located within the second section 108 and connected to the units 112a, 112b, 112c, a third terminal block 120c is located within the third section 110 and connected to the units 114a, 114b, 114c, and 114d. The units 112a, 112b, 112c are connected to the terminal block 120b in parallel. The units 114a, 114b, 114c, and 114d are connected to the terminal block 120c in parallel. The terminal blocks 120a, 120b, and 120c are connected in series by the single channel 122. Upon receiving a safety signal indicating a safety event within the safety zone, the safety distribution unit 116 transmits the safety signal to the safety bus 118. The safety bus 118 delivers the safety signal to every unit within the second and the third sections 108 and 110 that are associated with the safety zone. Upon receiving the safety signal, each unit is configured to enter a safe state (e.g., isolating power from one or more machines within the safety zone) to prevent hazardous motions.

Figure 2:
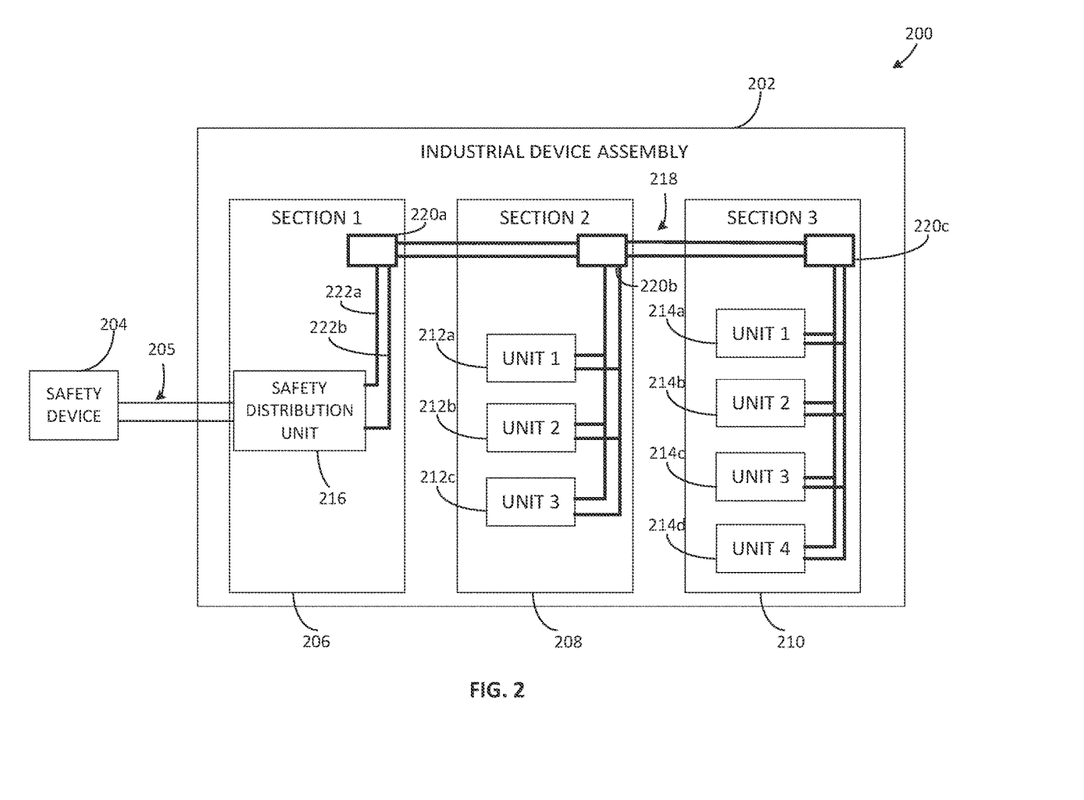
FIG. 2 shows a block diagram of an industrial safety system 200 according to an illustrative embodiment.

With reference to FIG. 2, a block diagram of an industrial safety system 200 is shown according to an illustrative embodiment. The industrial safety system 200 is configured to mitigate the risks of hazardous machine components within one or more safety zones according to the safety category 3 defined by the industry-specific functional safety standards (e.g., defined by the International Organization for Standardization, or the International Electrotechnical Commission). The industrial safety system 200 is configured with dual redundant channels 205 for conveying safety signals to ensure highly reliable safety response even in the event of a failure of one or more safety devices. The industrial safety system 200 includes one or more safety devices 204 and an industrial device assembly 202. The safety devices 204 include various devices that each has one or more contacts designed to close when the device is in a safe state, allowing a safety signal (e.g., 24 VDC signals) to pass and transmitting the safety signal to the industrial device assembly 202. The safety devices 204 include but not limited to proximity switches that determine when a safety gate is in the closed position, emergency stop pushbuttons, safety mats, light curtains, etc.

The industrial device assembly 202 may include various types of industrial device assemblies, such as motor control centers (MCCs), switchgear assemblies, and the like. The industrial device assembly 202 may be subdivided into one or more lineups, one or more sections within each lineup, and one or more units within each section. Each lineup may have 1 through N sections and each section may have 1 through M units. Each unit of the industrial device assembly 202 may contain one or more industrial automation devices that may include a component or a part that performs a specific operation for the industrial device assembly 202. For example, the industrial device assembly 202 includes a first section 206 that contains a safety distribution unit 216, a second section 208 that contains three units 212a, 212b, and 212c, and a third section 210 that contains four units 214a, 214b, 214c, 214d. Each unit in the industrial device assembly 202 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) The safety distribution unit 216 includes a safety monitoring relay or a safety I/O module configured to receive the redundant safety signals from the safety devices 204 and output a first safety signal and a second safety signal. The safety distribution unit 216 is also configured to provide local diagnostics to aid in status reporting and troubleshooting.

the industrial device assembly 202 further includes a safety bus 218 including a first channel 222a and a second channel 222b. The first channel 222a and the second channel 222b are redundant channels to convey safety signals indicating the same safety event. The redundant channels reduce the risks of missing safety signals during a safety event due to a malfunctioned channel. The safety bus 218 receives the first safety signal from the safety distribution unit 216 at the first channel 222a, which transmits the first safety signal to each unit within each section associated with the same safety zone. The safety bus 218 receives the second safety signal from the safety distribution unit 216 at the second channel 222b, which transmits the second safety signal to each unit within each section associated with the same safety zone. Each of the first channel 222a and the second channel 222b includes a single shielded cable that has two wires and a shield surrounding the two wires. The first wire carries a 24 VDC positive signal and the second wire carries a 24 VDC common signal. Each of the first and the second safety signals is transmitted within a corresponding single shielded cable by the corresponding 24 VDC positive signal and the corresponding 24 VDC common signal. The shield is used to reduce electrical noise from affecting the signals and reduce electromagnetic radiation. The safety distribution unit 216 may be also configured to provide short-circuit detection. For example, the safety distribution unit 216 may be configured to provide pulse testing between the output first and second safety signals for monitoring and detecting a cross fault channel (e.g., short circuit) between the first channel 222a and the second channel 222b. In some embodiments, the safety distribution unit 216 may provide other diagnostic processes (e.g., internal and external faults) and status of the safety devices.

The safety bus 218 includes a plurality of terminal blocks and the dual redundant channels (e.g., the first channel 222a and the second channel 222b) connected between the terminal blocks and corresponding units. Each terminal block is located in a respective section and connected to one or more units within the respective section. For example, a first terminal block 220a is located within the first section 206 and connected to the safety distribution unit 216, a second terminal block 220b is located within the second section 208 and connected to the units 212a, 212b, 212c, a third terminal block 220c is located within the third section 210 and connected to the units 214a, 214b, 214c, and 214d. The units 212a, 212b, 212c are connected to the terminal block 220b in parallel by the dual redundant channels 222. The units 214a, 214b, 214c, and 214d are connected to the terminal block 220c in parallel by the dual redundant channels 222. The terminal blocks 220a, 220b, and 220c are connected in series by the dual redundant channels 222. More details of the terminal blocks 220 will be provided in the following description of FIG. 9. For example, the terminal blocks 220 can be any Allen-Bradley Bulletin 1492 terminal blocks.

Upon receiving a first safety signal and a second safety signal indicating a safety event within the safety zone through the dual channels 205, the safety distribution unit 216 transmits the first safety signal to the first channel 222a and transmits the second safety signal to the second channel 222b. The safety bus 218 delivers both of the first and the second safety signals to every unit within the second and the third sections 208 and 210 that are associated with the same safety zone through the dual redundant channels 222. Upon receiving at least one of the first and the second safety signals, each unit is configured to enter a safe state (e.g., isolating power from one or more machines within the safety zone) to prevent hazardous motions.

Figure 3:
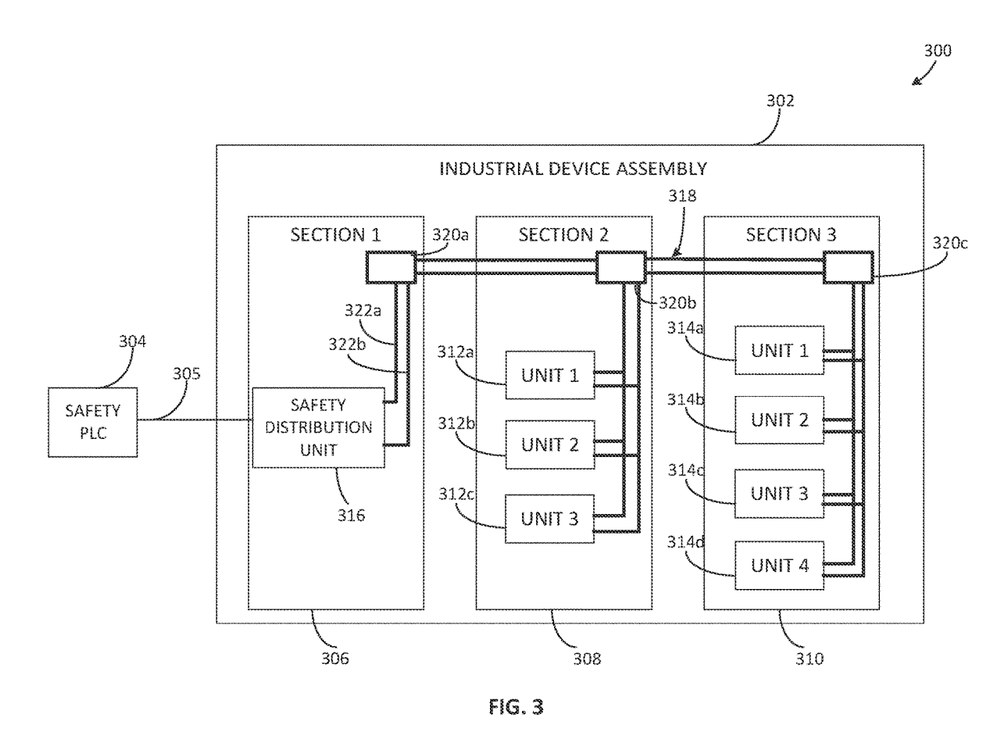
FIG. 3 shows a block diagram of an industrial safety system 300 according to an illustrative embodiment.

With reference to FIG. 3, a block diagram of an industrial safety system 300 is shown according to an illustrative embodiment. The industrial safety system 300 is configured to mitigate the risks of hazardous machine components within one or more safety zones according to the safety category 3 defined by the industry-specific functional safety standards (e.g., defined by the International Organization for Standardization, or the International Electrotechnical Commission). The industrial safety system 300 includes one or more safety devices (not shown), a safety programmable logic controller (PLC) 304, and an industrial device assembly 302. The industrial safety system 300 utilizes the safety PLC 304 to provide a safety network for communication of safety signals and control of the safety devices. The safety devices include various devices that each has one or more contacts designed to close when the device is in a safe state, allowing a safety signal (e.g., 24 VDC signals) to pass and transmitting the safety signal to the safety PLC 304. The safety devices include but not limited to proximity switches that determine when a safety gate is in the closed position, emergency stop pushbuttons, safety mats, light curtains, etc. The safety PLC 304 is configured to receive the safety signals from the safety devices and output redundant safety signals to the industrial device assembly 302 through a network connection 305 (e.g., an Ethernet/IP interface).

The industrial device assembly 302 may include various types of industrial device assemblies, such as motor control centers (MCCs), switchgear assemblies, and the like. The industrial device assembly 302 may be subdivided into one or more lineups, one or more sections within each lineup, and one or more units within each section. Each lineup may have 1 through N sections and each section may have 1 through M units. Each unit of the industrial device assembly 302 may contain one or more industrial automation devices that may include a component or a part that performs a specific operation for the industrial device assembly 302. For example, the industrial device assembly 302 includes a first section 306 that contains a safety distribution unit 316, a second section 308 that contains three units 312a, 312b, and 312c, and a third section 310 that contains four units 314a, 314b, 314c, 314d. Each unit in the industrial device assembly 302 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) The safety distribution unit 316 includes a safety configured to receive the redundant safety signals from the safety PLC 304 over the network connection 305 and output a first safety signal and a second safety signal. The safety distribution unit 316 is also configured to provide local diagnostics to aid in status reporting and troubleshooting.

the industrial device assembly 302 further includes a safety bus 318 including a first channel 322a and a second channel 322b. The first channel 322a and the second channel 322b are redundant channels to convey safety signals indicating the same safety event. The redundant channels reduce the risks of missing safety signals during a safety event due to a malfunctioned channel. The safety bus 318 receives the first safety signal from the safety distribution unit 316 at the first channel 322a, which transmits the first safety signal to each unit within each section associated with the same safety zone. The safety bus 318 receives the second safety signal from the safety distribution unit 216 at the second channel 322b, which transmits the second safety signal to each unit within each section associated with the same safety zone. Each of the first channel 322a and the second channel 322b includes a single shielded cable that has two wires and a shield surrounding the two wires. The first wire carries a 24 VDC positive signal and the second wire carries a 24 VDC common signal. Each of the first and the second safety signals is transmitted within a corresponding single shielded cable by the corresponding 24 VDC positive signal and the corresponding 24 VDC common signal. The shield is used to reduce electrical noise from affecting the signals and reduce electromagnetic radiation. The safety distribution unit 316 may be also configured to provide short-circuit detection. For example, the safety distribution unit 316 may be configured to provide pulse testing between the output first and second safety signals for monitoring and detecting a cross fault channel (e.g., short circuit) between the first channel 322a and the second channel 322b. In some embodiments, the safety distribution unit 316 may provide other diagnostic processes (e.g., internal and external faults) and status of the safety devices.

The safety bus 318 includes a plurality of terminal blocks and the dual redundant channels (e.g., the first channel 322a and the second channel 322b) connected between the terminal blocks and corresponding units. Each terminal block is located in a respective section and connected to one or more units within the respective section. For example, a first terminal block 320a is located within the first section 306 and connected to the safety distribution unit 316, a second terminal block 320b is located within the second section 308 and connected to the units 312a, 312b, 312c, a third terminal block 320c is located within the third section 310 and connected to the units 314a, 314b, 314c, and 314d. The units 312a, 312b, 312c are connected to the terminal block 320b in parallel by the dual redundant channels 322. The units 314a, 314b, 314c, and 314d are connected to the terminal block 320c in parallel by the dual redundant channels 322. The terminal blocks 320a, 320b, and 320c are connected in series by the dual redundant channels 322. More details of the terminal blocks 320 will be provided in the following description of FIG. 9. For example, the terminal blocks 320 can be any Allen-Bradley Bulletin 1492 terminal blocks.

Upon receiving a first safety signal and a second safety signal indicating a safety event within the safety zone through the network connection 305, the safety distribution unit 316 transmits the first safety signal to the first channel 322a and transmits the second safety signal to the second channel 322b. The safety bus 318 delivers both of the first and the second safety signals to every unit within the second and the third sections 308 and 310 that are associated with the same safety zone through the dual redundant channels 322. Upon receiving at least one of the first and the second safety signals, each unit is configured to enter a safe state (e.g., isolating power from one or more machines within the safety zone) to prevent hazardous motions.

Figure 4:
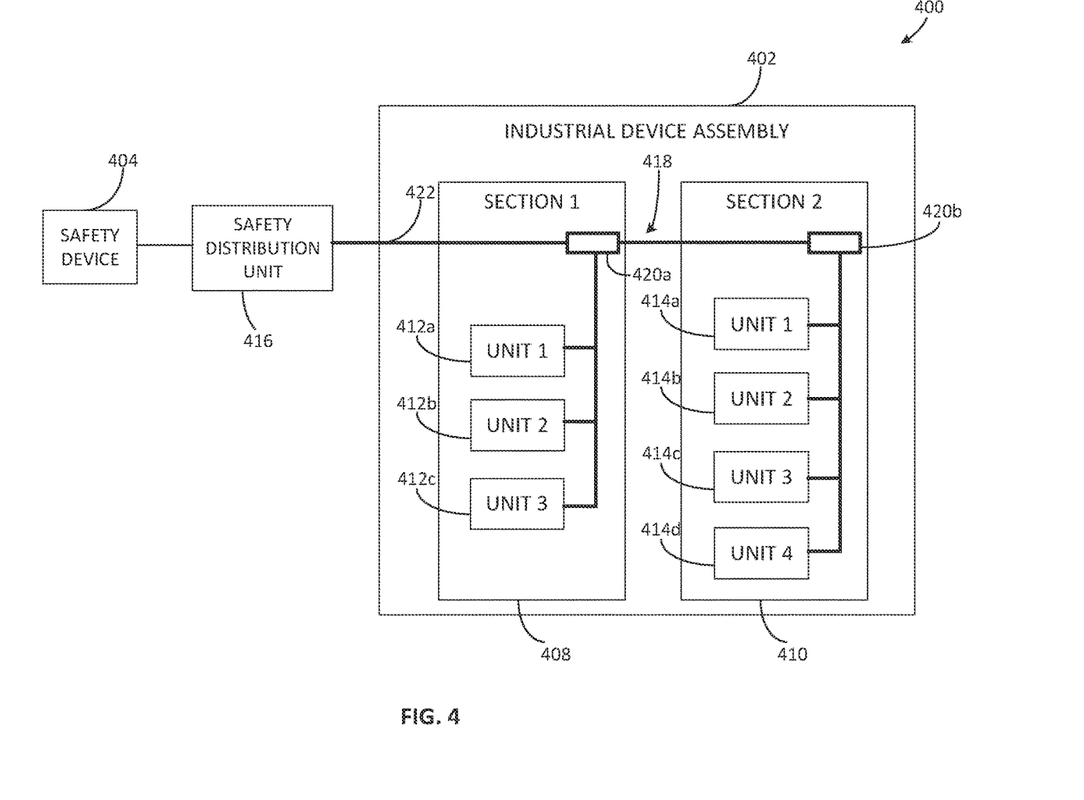
FIG. 4 shows a block diagram of an industrial safety system 400 according to an illustrative embodiment.

With reference to FIG. 4, a block diagram of an industrial safety system 400 is shown according to an illustrative embodiment. The industrial safety system 400 is configured to mitigate the risks of hazardous machine components within one or more safety zones according to the safety category 1 or category 2 defined by the industry-specific functional safety standards (e.g., defined by the International Organization for Standardization, or the International Electrotechnical Commission). The industrial safety system 400 includes one or more safety devices 404, a safety distribution unit 416, and an industrial device assembly 402. The safety devices 404 include various devices that each has one or more contacts designed to close when the device is in a safe state, allowing a safety signal (e.g., 24 VDC signals) to pass and transmitting the safety signal to the safety distribution unit 416. The safety devices 404 include but not limited to proximity switches that determine when a safety gate is in the closed position, emergency stop pushbuttons, safety mats, light curtains, etc. The safety distribution unit 416 includes a safety relay configured to receive safety signals from the safety devices 404 and transmit the safety signals to the industrial device assembly 402.

The industrial device assembly 402 may include various types of industrial device assemblies, such as motor control centers (MCCs), switchgear assemblies, and the like. The industrial device assembly 402 may be subdivided into one or more lineups, one or more sections within each lineup, and one or more units within each section. Each lineup may have 1 through N sections and each section may have 1 through M units. Each unit of the industrial device assembly 402 may contain one or more industrial automation devices that may include a component or a part that performs a specific operation for the industrial device assembly 402. Each section is associated with a safety zone including one or more hazardous machine components that, if inappropriately breached, may cause injury to an operator. For example, the industrial device assembly 402 includes a first section 408 that contains three units 412a, 412b, and 412c, and a second section 410 that contains four units 414a, 414b, 414c, and 414d. Each unit in the industrial device assembly 402 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) The section 1 408 and section 2 410 are associated with a same safety zone.

The industrial device assembly 402 further includes a safety bus 418 designed with a single channel 422 and configured to transmit safety signals to each unit within each section associated with the same safety zone. The safety bus 418 is connected to and receives safety signals from the safety distribution unit 416. The safety bus 418 includes a plurality of terminal blocks 420 and the single channel 422 connected between the terminal blocks 420 and corresponding units. The single channel 422 may include a single shielded cable that has two wires and a shield surrounding the two wires. The first wire carries a 24 VDC positive signal and the second wire carries a 24 VDC common signal. Each safety signal is transmitted within the single shielded cable by the 24 VDC positive signal and the 24 VDC common signal. The shield is used to reduce electrical noise from affecting the signals and reduce electromagnetic radiation. The terminal blocks 420 can be any suitable type of terminal blocks that is able to connect the single channel 422 and corresponding units. More details of the terminal blocks 420 will be provided in the following description of FIG. 8. For example, the terminal blocks 420 can be any Allen-Bradley Bulletin 1492 terminal blocks. Each terminal block is located in a respective section and connected to one or more units within the respective section. For example, a first terminal block 420a is located within the first section 408 and connected between the safety distribution unit 416 and a second terminal block 420b through the single channel 422, and connected to the units 412a, 412b, 412c. The second terminal block 420b is located within the second section 410 and connected to the units 414a, 414b, 414c, and 414d. The units 412a, 412b, 412c are connected to the terminal block 420a in parallel. The units 414a, 414b, 414c, and 414d are connected to the terminal block 420c in parallel. Upon receiving a safety signal indicating a safety event within the safety zone, the safety bus 418 delivers the safety signal to every unit within the first and the second sections 408 and 410 that are associated with the safety zone. Upon receiving the safety signal, each unit is configured to enter a safe state (e.g., isolating power from one or more machines within the safety zone) to prevent hazardous motions.

Figure 5:
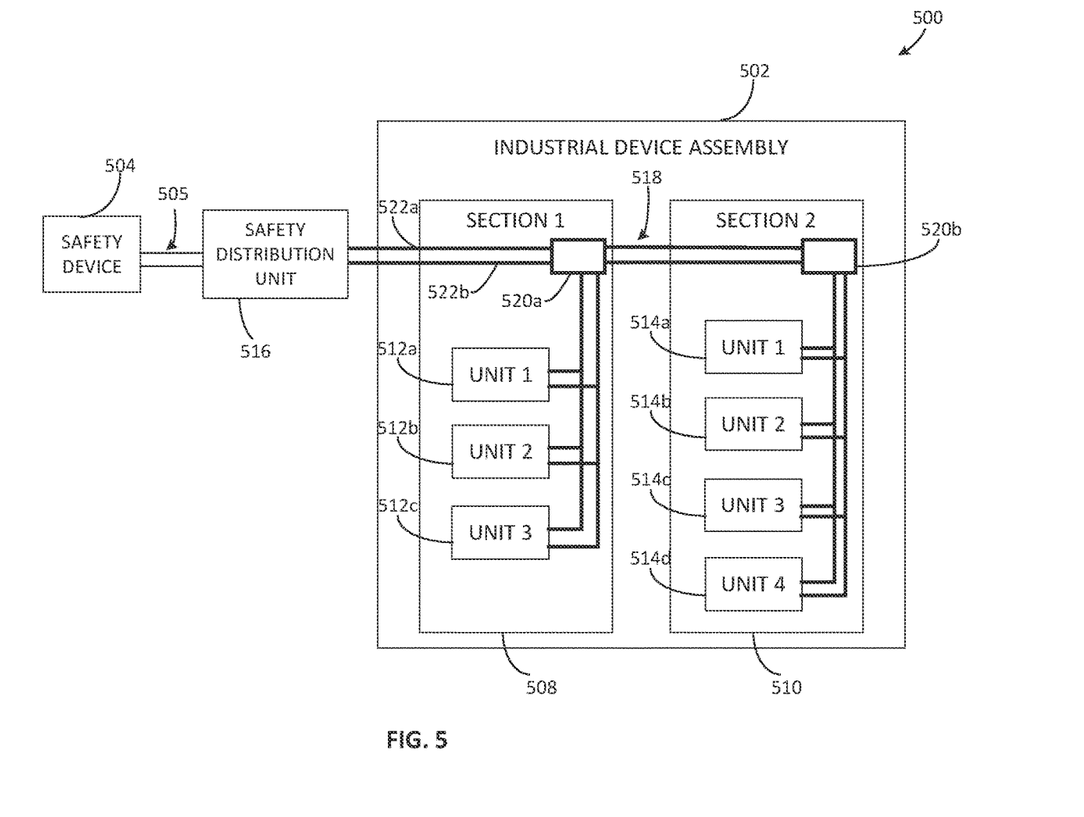
FIG. 5 shows a block diagram of an industrial safety system 500 according to an illustrative embodiment.

With reference to FIG. 5, a block diagram of an industrial safety system 500 is shown according to an illustrative embodiment. The industrial safety system 500 is configured to mitigate the risks of hazardous machine components within one or more safety zones according to the safety category 3 defined by the industry-specific functional safety standards (e.g., defined by the International Organization for Standardization, or the International Electrotechnical Commission). The industrial safety system 500 is configured with dual redundant channels 505 for conveying safety signals to ensure highly reliable safety response even in the event of a failure of one or more safety devices. The industrial safety system 500 includes one or more safety devices 504, a safety distribution unit 516, and an industrial device assembly 502. The safety devices 504 include various devices that each has one or more contacts designed to close when the device is in a safe state, allowing a safety signal (e.g., 24 VDC signals) to pass and transmitting the safety signal to the safety distribution unit 516. The safety devices 504 include but not limited to proximity switches that determine when a safety gate is in the closed position, emergency stop pushbuttons, safety mats, light curtains, etc. The safety distribution unit 516 includes a safety monitoring relay or a safety I/O module configured to receive the redundant safety signals from the safety devices 504 and output a first safety signal and a second safety signal. The safety distribution unit 516 is also configured to provide local diagnostics to aid in status reporting and troubleshooting.

The industrial device assembly 502 may include various types of industrial device assemblies, such as motor control centers (MCCs), switchgear assemblies, and the like. The industrial device assembly 502 may be subdivided into one or more lineups, one or more sections within each lineup, and one or more units within each section. Each lineup may have 1 through N sections and each section may have 1 through M units. Each unit of the industrial device assembly 502 may contain one or more industrial automation devices that may include a component or a part that performs a specific operation for the industrial device assembly 502. For example, the industrial device assembly 502 includes a first section 508 that contains three units 512a, 512b, and 512c, and a second section 510 that contains four units 514a, 514b, 514c, and 514d. Each unit in the industrial device assembly 502 contains at least one industrial automation device, such as (e.g., starters, drives, electric motors, valves, actuators, temperature elements, pressure sensors, networking sensors, or a myriad of machinery or devices used for manufacturing, processing, material handling, and other applications.)

the industrial device assembly 502 further includes a safety bus 518 including a first channel 522a and a second channel 522b. The first channel 522a and the second channel 522b are redundant channels to convey safety signals indicating the same safety event. The redundant channels reduce the risks of missing safety signals during a safety event due to a malfunctioned channel. The safety bus 518 receives the first safety signal from the safety distribution unit 516 at the first channel 522a, which transmits the first safety signal to each unit within each section associated with the same safety zone. The safety bus 518 receives the second safety signal from the safety distribution unit 516 at the second channel 522b, which transmits the second safety signal to each unit within each section associated with the same safety zone. The first channel 522a includes a single shielded cable that has two wires and a shield surrounding the two wires. Similarly, the second channel 522b also includes a single shielded cable that has two wires and a shield surrounding the two wires. The first wire carries a 24 VDC positive signal and the second wire carries a 24 VDC common signal. Each of the first and the second safety signals is transmitted within a corresponding single shielded cable by the corresponding 24 VDC positive signal and the corresponding 24 VDC common signal. The shield is used to reduce electrical noise from affecting the signals and reduce electromagnetic radiation. The safety distribution unit 516 may be also configured to provide short-circuit detection. For example, the safety distribution unit 516 is configured to provide pulse testing between the output first and second safety signals for monitoring and detecting a cross fault channel (e.g., short circuit) between the first channel 522a and the second channel 522b. In some embodiments, the safety distribution unit 516 may provide other diagnostic processes (e.g., internal and external faults) and status of the safety devices.

The safety bus 518 includes a plurality of terminal blocks and the dual redundant channels (e.g., the first channel 522a and the second channel 522b) connected between the terminal blocks and corresponding units. Each terminal block is located in a respective section and connected to one or more units within the respective section. For example, a first terminal block 520a is located within the first section 508 and connected between the safety distribution unit 516 and a second terminal block 520b through the dual channel 522. The first terminal block 520a is also connected to the units 512a, 512b, 512c. The second terminal block 520b is located within the second section 510 and connected to the units 514a, 514b, 514c, and 514d. The units 512a, 512b, 512c are connected to the terminal block 510a in parallel by the dual redundant channels 522. The units 514a, 514b, 514c, and 514d are connected to the terminal block 520b in parallel by the dual redundant channels 522. More details of the terminal blocks 520 will be provided in the following description of FIG. 9. For example, the terminal blocks 520 can be any Allen-Bradley Bulletin 1492 terminal blocks.

Upon receiving a first safety signal and a second safety signal indicating a safety event within the safety zone, the safety distribution unit 516 transmits the first safety signal to the first channel 522a and transmits the second safety signal to the second channel 522b. The safety bus 518 delivers both of the first and the second safety signals to every unit within the first and the second sections 508 and 510 that are associated with the same safety zone through the dual redundant channels 522. Upon receiving at least one of the first and the second safety signals, each unit is configured to enter a safe state (e.g., isolating power from one or more machines within the safety zone) to prevent hazardous motions.

Figure 6:
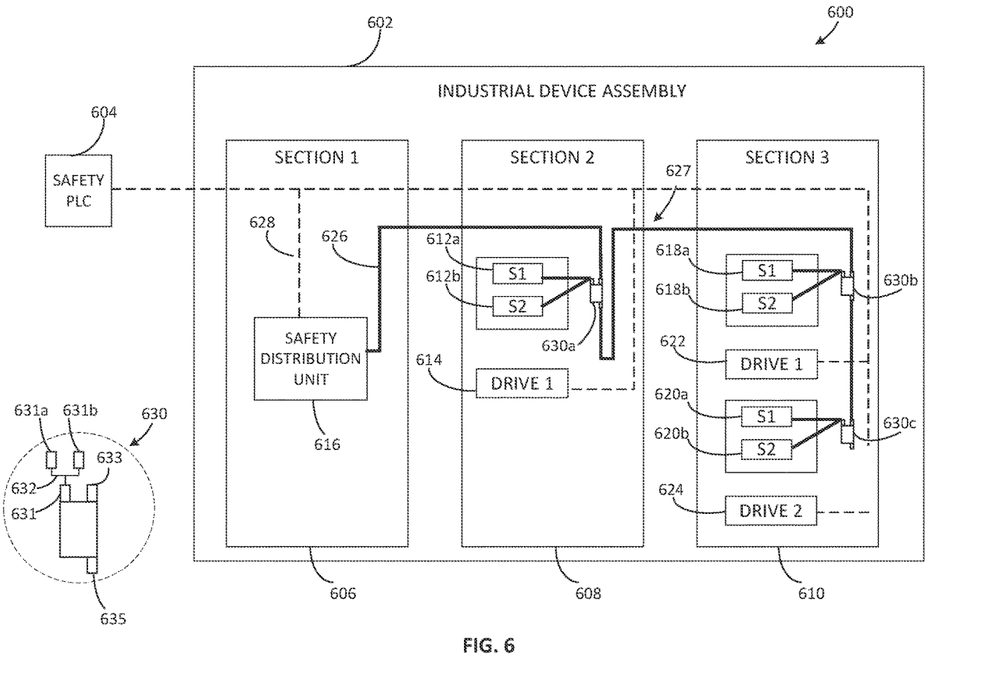
FIG. 6 shows a block diagram of an industrial safety system 600 according to an illustrative embodiment.

With respect to FIG. 6, a block diagram of an industrial safety system 600 is shown according to an illustrative embodiment. The industrial safety system 600 is configured to mitigate the risks of hazardous machine components within one or more safety zones according to the safety category 3 defined by the industry-specific functional safety standards (e.g., defined by the International Organization for Standardization, or the International Electrotechnical Commission). The industrial safety system 600 includes one or more safety devices (not shown), a safety PLC 604, and an industrial device assembly 602. The safety devices include various devices that each has one or more contacts designed to close when the device is in a safe state, allowing a safety signal (e.g., 24 VDC signals) to pass and transmitting the safety signal to the safety PLC 604 and further to the industrial device assembly 602. The safety devices include but not limited to proximity switches that determine when a safety gate is in the closed position, emergency stop pushbuttons, safety mats, light curtains, etc. The safety PLC 604 is configured to receive the safety signals from the safety devices and output redundant safety signals to the industrial device assembly 602 through a network connection (e.g., an Ethernet/IP interface).

The industrial device assembly 602 may include various types of industrial device assemblies, such as motor control centers (MCCs), switchgear assemblies, and the like. The industrial device assembly 602 may be subdivided into one or more lineups, one or more sections within each lineup, and one or more units within each section. Each lineup may have 1 through N sections and each section may have 1 through M units. Each unit of the industrial device assembly 602 may contain one or more industrial automation devices that may include a component or a part that performs a specific operation for the industrial device assembly 602. Each unit in the industrial device assembly 602 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) For example, the industrial device assembly 602 includes a first section 606 that contains a safety distribution unit 616, a second section 608 that contains a starter unit 612 that further includes dual contactors 612a and 612b, a drive unit 614, and a third section 610 that contains a first starter unit 618 including dual contactors 618a and 618b, a second starter unit 620 including dual starters 620a and 620b, a first drive unit 622, and a second drive unit 624. The industrial device assembly 602 also includes a safety bus 627 configured to deliver safety signals to one or more units within the industrial device assembly 602. The industrial device assembly 602 further includes a safety network communication channel 628 configured to deliver safety signals through network connections to one or more network enabled units (e.g., drives 614, 622, 624) in the industrial device assembly 602. In some embodiments, the safety bus 627 is configured to connect to all the units that do not have network communication capability (e.g., the starter units, 612, 618, 620).

When a safety event occurs, the safety PLC 604 may transmit a safety signal in response to the safety event to the industrial device assembly 602. In some embodiments, the safety PLC 604 may transmit redundant safety signals in response to the event to the industrial device assembly 602. Upon receiving the safety signal at the safety distribution unit 616, the industrial device assembly 602 utilizes the network communication channel 628 to transmit the safety signal to the one or more network enabled units that are connected to the network communication channel 628. At the same time, upon receiving the safety signal, the industrial device assembly 602 utilizes the safety bus 627 to transmit the safety signal to each connected unit (e.g., starters 612, 618, 620). The safety distribution unit 616 may include a safety I/O module and a safety monitoring relay. The safety I/O module is configured to receive the safety signals from the safety PLC 604 and transmit the safety signals to the safety monitoring relay. The safety monitoring relay is configured to receive the safety signals from the safety I/O module and output the safety signals to the safety bus 627. The network communication channel 628 connects each network enabled unit to the safety PLC 604 in parallel such that these enabled units can receive the safety signal at the same time. For example, the drive units 614, 622, and 624 are connected to network communication channel 628 in parallel and configured to receive the safety signals at the same time through the network communication channel 628. Upon receiving the safety signal indicating the safety event, the drive units 614, 622, and 624 enter to a safety state (e.g., isolating power from one or more machines within the safety zone) to prevent hazardous motions.

The safety bus 627 includes multiple safety taps (e.g., taps 630a, 630b, 630c) connecting in series by a single channel 626. For example, upon receiving the safety signal from the safety distribution unit 616, the safety bus 627 is configured to deliver the safety signal to the safety taps 630a, 630b, 630c in sequence. Each safety tap 630 is also connected to a corresponding unit and configured to provide bi-directional communication with the corresponding unit. The bi-directional communication provided by the safety tap allows each safety tap 630 to deliver one or more safety signals to a corresponding unit and receive status information from the corresponding unit. The safety tap 630 is also configured to provide local diagnostic analysis. Each safety tap 630 includes a first terminal 633 configured to receive the safety signal, a second terminal 631 and a third terminal 635 configured to output the safety signal. The second terminal 631 may be connected to a connector 632 that extends the terminal 631 to two terminals 631a and 631b. In some embodiments, each of the terminals 631, 633, 635 may be configured to receive safety status and command redundant safety output signals. For example, upon receiving a safety signal at the first terminal 633, the safety tap 630a is configured to generate a first output safety signal to a first contactor 612a and receive contactor status via the terminal 631a, and generate a second output safety signal to a second contactor 612b and receive contactor status via the terminal 631b, and also configured to generate a third output safety signal to the safety tap 630b via the third terminal 635. Similarly, upon receiving the safety signal from the safety tap 630a at the first terminal 633, the safety tap 630b is configured to generate a first output safety signal to a first contactor 618a and receive contactor status via the terminal 631a and a second output safety signal to a second starter 618b and receive contactor status via the terminal 631b, and also configured to generate a third output safety signal to the safety tap 630c via the third terminal 635. Upon receiving the safety signal from the safety tap 630b at the first terminal 633, the safety tap 630c is configured to generate a first output safety signal to a first contactor 620a and receive contactor status via the terminal 631a, and generate a second output safety signal to a second contactor 620b and receive contactor status via the terminal 631b. Since the safety tap 630c is the last tap on the safety bus 627, a terminator may be installed on the third terminal 635. The safety tap 630 can be any suitable device that provides the described functionality, such as the safety device described in U.S. Pat. No. 9,841,142B2, "SINGLE-WIRE INDUSTRIAL SAFETY SYSTEM WITH SAFETY DEVICE DIAGNOSTIC COMMUNICATION," the content of which is hereby incorporated by reference in its entirety. Upon receiving the safety signals at each starter in each starter unit, the starter enters to a safety state that isolates power from one or more machines within the safety zone to prevent hazardous motions.

Figure 7:
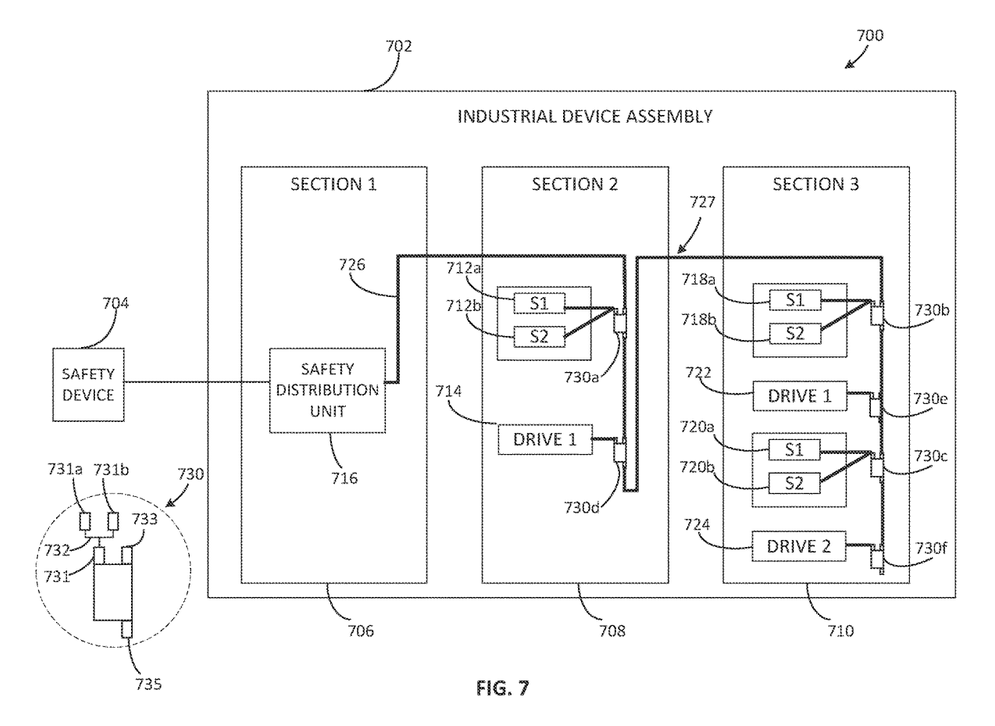
FIG. 7 shows a block diagram of an industrial safety system 700 according to an illustrative embodiment.

With respect to FIG. 7, a block diagram of an industrial safety system 700 is shown according to an illustrative embodiment. The industrial safety system 700 is configured to mitigate the risks of hazardous machine components within one or more safety zones according to the safety category 3 defined by the industry-specific functional safety standards (e.g., defined by the International Organization for Standardization, or the International Electrotechnical Commission). The industrial safety system 700 includes one or more safety devices 704 and an industrial device assembly 702. The safety devices 704 include various devices that each has one or more contacts designed to close when the device is in a safe state, allowing a safety signal (e.g., 24 VDC signals) to pass and transmitting the safety signal to the industrial device assembly 702. The safety devices 704 include but not limited to proximity switches that determine when a safety gate is in the closed position, emergency stop pushbuttons, safety mats, light curtains, etc.

The industrial device assembly 702 may include various types of industrial device assemblies, such as motor control centers (MCCs), switchgear assemblies, and the like. The industrial device assembly 702 may be subdivided into one or more lineups, one or more sections within each lineup, and one or more units within each section. Each lineup may have 1 through N sections and each section may have 1 through M units. Each unit of the industrial device assembly 702 may contain one or more industrial automation devices that may include a component or a part that performs a specific operation for the industrial device assembly 702. Each unit in the industrial device assembly 702 contains at least one industrial automation device, such as (e.g., starters, drives, electric motors, valves, actuators, temperature elements, pressure sensors, networking sensors, or a myriad of machinery or devices used for manufacturing, processing, material handling, and other applications.) For example, the industrial device assembly 702 includes a first section 706 that contains a safety distribution unit 716, a second section 708 that contains a starter unit 712 that further includes dual starters 712a and 712b, a drive unit 714, and a third section 710 that contains a first starter unit 718 including dual starters 718a and 718b, a second starter unit 720 including dual starters 720a and 720b, a first drive unit 722, and a second drive unit 724. The industrial device assembly 702 also includes a safety bus 727 configured to deliver safety signals to each unit of all sections that are associated with a same safety zone.

When a safety event occurs, the safety device transmits a safety signal to the safety distribution unit within industrial device assembly 702. Upon receiving the safety signal, the safety distribution unit 716 transmits the safety signal to the safety bus 727 that further transmits the safety signal to each connected unit (e.g., starters 712, 718, 720, and drives 714, 722, 724.) The safety distribution unit 716 includes a safety relay configured to receive the safety signals from the safety devices 704 and output the safety signal to the safety bus 727.

The safety bus 727 includes multiple safety taps (e.g., taps 730a, 730b, 730c, 730d, 730e, 730f) connecting in series by a single channel 726. For example, upon receiving the safety signal from the safety distribution unit 716, the safety bus 727 is configured to deliver the safety signal to the safety taps 730a, 730b, 730c, 730d, 730e, 730f in sequence. Each safety tap 730 is also connected to a corresponding unit and configured to provide bi-directional communication with the corresponding unit. The bi-directional communication provided by the safety tap 730 allows each safety tap 730 to deliver one or more safety signals to a corresponding unit and receive status information from the corresponding unit. The safety tap 730 is also configured to provide local diagnostic analysis. Each safety tap 730 includes a first terminal 733 configured to receive the safety signal, a second terminal 731 and a third terminal 735 configured to output the safety signal. The second terminal 731 (e.g., terminals 731 of the taps 730a, 730b, and 730c) may be connected to a connector 732 that extends the terminal 731 to two terminals 731a and 731b. In some embodiments, each of the terminals 731, 733, 735 may be configured to receive safety status and command redundant safety output signals. For example, upon receiving a safety signal at the first terminal 733, the safety tap 730a is configured to generate a first output safety signal to a first starter 712a via the terminal 731a and a second output safety signal to a second starter 712b via the terminal 731b, and also configured to generate a third output safety signal to the safety tap 730d via the third terminal 735. Similarly, upon receiving the safety signal from the safety tap 730a at the first terminal 733, the safety tap 730d is configured to generate a first output safety signal to a drive unit 714 via the second terminal 731, and also configured to generate a second output safety signal to the safety tap 730b via the third terminal 735. Upon receiving the safety signal from the safety tap 730d at the first terminal 733, the safety tap 730b is configured to generate a first output safety signal to a first contactor 718a via the terminal 731a and a second output safety signal to a second contactor 718b via the second terminal 731 via the terminal 731b. Each of the terminals 731a and 731b may be configured to receive contactor status or drive status. Since the safety tap 730f is the last tap on the safety bus 727, a terminator may be installed on the third terminal 735. The safety tap 730 can be any suitable device that provides the described functionality, such as the safety device described in U.S. Pat. No. 9,841,142B2, "SINGLE-WIRE INDUSTRIAL SAFETY SYSTEM WITH SAFETY DEVICE DIAGNOSTIC COMMUNICATION," the content of which is hereby incorporated by reference in its entirety. Upon receiving the safety signals at each unit, each unit enters to a safety state that isolates power from one or more machines within the safety zone to prevent hazardous motions.

Figure 8:
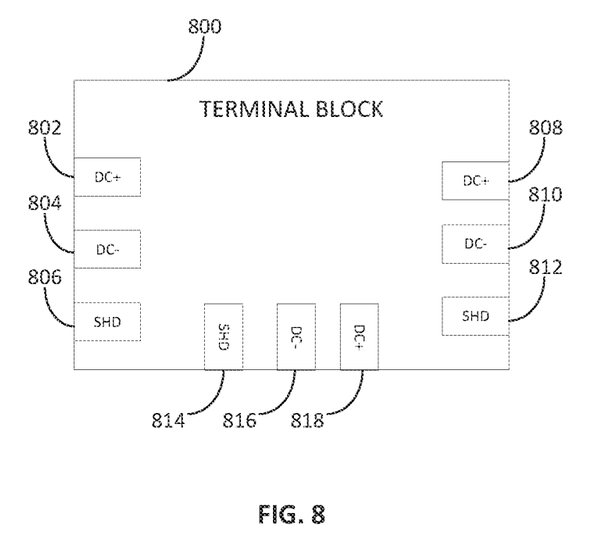
FIG. 8 shows a block diagram of a terminal block 800 according to an illustrative embodiment.

With respect to FIG. 8, a block diagram of a terminal block 800 is shown according to an illustrative embodiment. The terminal block 800 can be used in the safety buses 118 and 418 as described above regarding to FIG. 1 and FIG. 4. The terminal block 800 includes a first input terminal 802 for receiving a positive input (24 VDC positive), a second input terminal 804 for receiving a common input (24 VDC common), and a third input terminal 806 for receiving an input from a shield of a cable. For example, the first input terminal 802 can be connected to a first wire of the single shielded cable (e.g., the cable 122 in FIG. 1, and the cable 412 in FIG. 4) for receiving the 24 VDC positive signal. The second input terminal 804 can be connected to a second wire of the single shielded cable (e.g., the cable 122 in FIG. 1, and the cable 412 in FIG. 4) for receiving the 24 VDC common signal. The third input terminal 806 can be connected to the shield of the single shielded cable (e.g., the cable 122 in FIG. 1, and the cable 412 in FIG. 4) for receiving the signals carried on the shield. The terminal block 800 also includes output terminals 808, 810, and 812 for connecting to the positive, common, and shield wires of the single shield cable 122 or 412 respectively and further connected to an adjacent terminal block via the single shielded cable. The terminal block 800 further includes output terminals 814, 816, and 818 for connecting the positive, common, and shield wires of the single shield cable 122 or 412 respectively and further connected to each corresponding unit via the single shielded cable. The terminal block 800 can be any suitable terminal blocks that includes the described terminals, such as any Allen-Bradley Bulletin 1492 terminal blocks.

Figure 9:
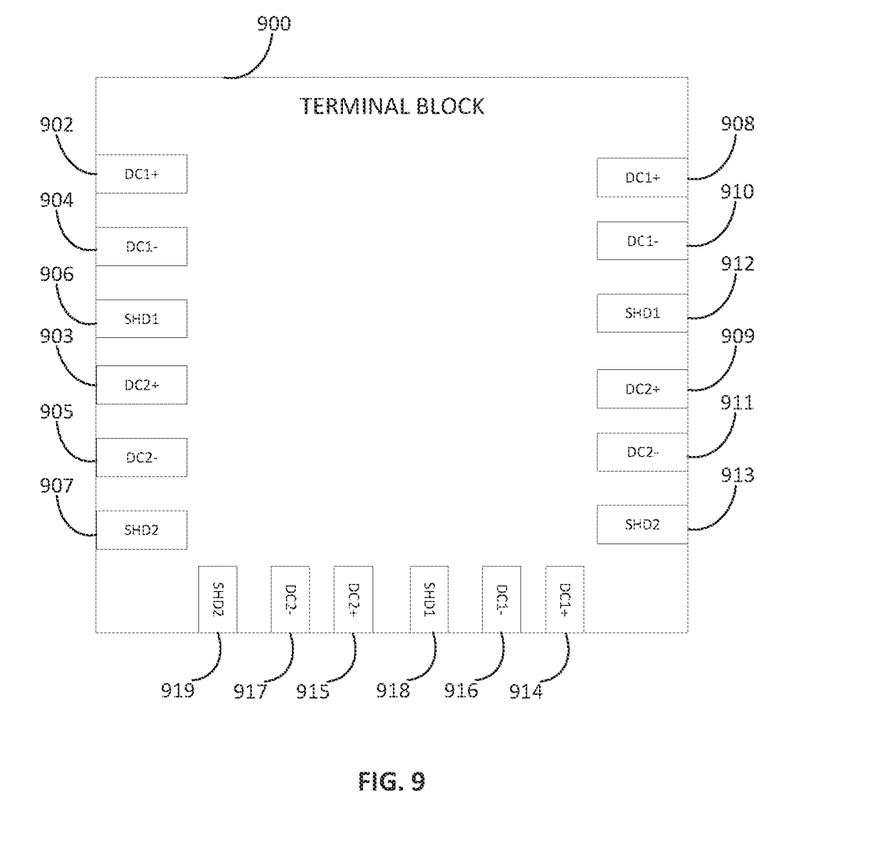
FIG. 9 a block diagram of a terminal block 900 according to an illustrative embodiment.

With respect to FIG. 9, a block diagram of a terminal block 900 is shown according to an illustrative embodiment. The terminal block 900 can be used in the safety buses 218, 318, and 518 as described above regarding to FIG. 2, FIG. 3, and FIG. 5. The terminal block 900 includes a first set of input terminals 902, 904, 906 for connecting to a first single shielded cable (e.g., cable 222a, 322a, 522a) and receiving a first safety signal. The input terminal 902 is configured for connecting to a first wire of the first single shielded cable for receiving a first positive input (24 VDC positive). The input terminal 904 is configured for connecting to a second wire of the first single shielded cable for receiving a common input (24 VDC common). The input terminal 906 is configured for connecting to the shield of the first single shielded cable for receiving the signals carried on the shield. The terminal block 900 also includes a second set of input terminals 903, 905, 907 for connecting to a second single shielded cable (e.g., cable 222b, 322b, 522b) and receiving a second safety signal that is redundant signals to the first safety signal. The input terminal 903 is configured for connecting to a first wire of the second single shielded cable for receiving a second positive input (24 VDC positive). The input terminal 905 is configured for connecting to a second wire of the second single shielded cable for receiving a second common input (24 VDC common). The third input terminal 906 is configured for connecting to the shield of the second single shielded cable for receiving the signals carried on the shield.

The terminal block 900 further includes a first set of output terminals 908, 910, and 912 for connecting to the positive, common, and shield wires of the first single shield cable 222a, 322a, or 522a respectively and further connected to an adjacent terminal block via the first single shielded cable. The terminal block 900 further includes a second set of output terminals 909, 911, and 913 for connecting to the positive, common, and shield wires of the second single shield cable 222b, 322b, or 522b respectively and further connected to an adjacent terminal block via the second single shielded cable. The terminal block 900 further includes a third set of output terminals 914, 916, and 918 for connecting the positive, common, and shield wires of the first single shield cable 222a, 322a, or 522a respectively and further connected to each corresponding unit via the first single shielded cable. The terminal block 900 further includes a fourth set of output terminals 915, 917, and 919 for connecting the positive, common, and shield wires of the second single shield cable 222b, 322b, or 522b respectively and further connected to each corresponding unit via the second single shielded cable. The terminal block 900 can be any suitable terminal blocks that includes the described terminals, such as any Allen-Bradley Bulletin 1492 terminal blocks.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

As used in this disclosure, the terms "component," "system," "unit," "section," "controller," "terminal," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of terminals includes one or more terminals; etc.

What is claimed is:

1. A motor control center (MCC) for an industrial system, the MCC comprising:
   a housing comprising:
      a section comprising one or more units, wherein each of the one or more units comprises one or more industrial automation devices;
      a safety distribution unit configured to:
         communicatively couple to a safety device external to the MCC, wherein the safety device is configured to detect a safety hazard and output one or more safety signals indicative of the safety hazard being present and
         receive the one or more safety signals from the safety device; and
      a safety bus comprising:

a first terminal block communicatively coupled to the safety distribution unit and configured to receive the one or more safety signals from the safety distribution unit and a second terminal block communicatively coupled to the first terminal block and included in the section, wherein the second terminal block is configured to:

receive the one or more safety signals from the first terminal block; and deliver the one or more safety signals to each unit of the one or more units.

2. The MCC of claim 1, comprising a second section, wherein the second section comprises the first terminal block and the safety distribution unit.

3. The MCC of claim 1, wherein the one or more industrial automation devices comprise one or more starters, one or more drives, one or more electric motors, one or more valves, one or more actuators, one or more temperature elements, one or more pressure sensors, one or more networking sensors, or a combination thereof.

4. The MCC of claim 1, wherein the safety device comprises ones or more proximity switches, one or more emergency stop pushbuttons, one or more safety mats, one or more light curtains, or a combination thereof.

5. The MCC of claim 1, wherein the safety distribution unit is configured to provide short-circuit detection and diagnostics.

6. The MCC of claim 1, wherein the the first terminal block and the second terminal block are configured to connect to one another in series.

7. The MCC of claim 6, wherein the one or more units are configured to connect to the second terminal block in parallel.

8. The MCC of claim 6, wherein the safety bus comprises a single channel comprising a single shielded cable configured to connect the first terminal block to the second terminal block and configured to convey the one or more safety signals from the first terminal block to the second terminal block, wherein the shielded cable comprises a first wire, a second wire, and a shield surrounding the first and the second wires.

9. The MCC of claim 8, wherein:
the first terminal block comprises a first output terminal, a second output terminal, and a third output terminal; and
the second terminal block comprises a first input terminal, a second input terminal, and a third input terminal.

10. The MCC of claim 9, wherein:
the first wire is:
  configured to connect to the first input terminal and the first output terminal; and
  configured to carry a 24 VDC positive signal;
the second wire is:
  configured to connect to the second input terminal and the second output terminal; and
  configured to carry a 24 VDC common signal; and
the shield is connected to the third input terminal and the third output terminal.

11. The MCC of claim 6, wherein the safety bus comprises:
a first channel comprising a first shielded cable configured to connect the first terminal block to the second terminal block and configured to convey a first safety signal of the one or more safety signals from the first terminal block to the second terminal block, wherein the first shielded cable comprises a first wire, a second wire, and a first shield surrounding the first wire and the second wire; and a second channel comprising a second shielded cable configured to connect the first terminal block to the second terminal block and configured to convey a second safety signal of the one or more safety signals from the first terminal block to the second terminal block, wherein the second shielded cable comprises a third wire, a fourth wire, and a second shield surrounding the third wire and the fourth wire.

12. The MCC of claim 11, wherein:
the first terminal block comprises: a first set of output terminals and a second set of output terminals; and
the second terminal block comprises a first set of input terminals, a second set of input terminals, a third set of output terminals, and a fourth set of output terminals.

13. The MCC of claim 12, wherein:
the first wire is:
  configured to connect to a first terminal of the first set of input terminals and a first terminal of the first set of output terminal; and
  configured to carry a first 24 VDC positive signal;
the second wire is:
  configured to connect to a second terminal of the first set of input terminals and a second terminal of the first set of output terminals; and
  configured to carry a first 24 VDC common signal; and
the first shield is configured to connect to a third terminal of first set of input terminals and a third terminal of the first set of output terminals.

14. The MCC of claim 13, wherein:
the third wire is:
  configured to connect to a first terminal of the second set of input terminals and a first terminal of the second set of output terminals; and
  configured to carry a second 24 VDC positive signal;
the fourth wire is:
  configured to connect to a second terminal of the second set of input terminals and a second terminal of the second set of output terminals; and
  configured to carry a second 24 VDC common signal;
the second shield is connected to a third terminal of second set of input terminals and a third terminal of the second set of output terminals;
the third set of output terminals is communicatively coupled to the one or more industrial automation devices and configured to convey the first safety signal to the one or more industrial automation devices; and
the fourth set of output terminals communicatively coupled to the one or more industrial automation devices and configured to convey the first safety signal to the one or more industrial automation devices.

15. An industrial device assembly, comprising:
a housing comprising:
  a section comprising one or more units, wherein each of the one or more units comprises one or more industrial automation devices;
  a safety distribution unit configured to:
    communicatively couple to a safety device external to the industrial device assembly, wherein the safety device is configured to detect a presence of a person in an industrial automation system and output one or more safety signals indicative of the presence of the person; and
    receive the one or more safety signals from the safety device; and a safety bus comprising:
- a first terminal block communicatively coupled to the safety distribution unit and configured to receive the one or more safety signals from the safety distribution unit and
- a second terminal block communicatively coupled to the first terminal block and included in the section, wherein the second terminal block is configured to:
  - receive the one or more safety signals from the first terminal block; and
  - deliver the one or more safety signals to each unit of the one or more units.

16. The industrial device assembly of claim 15, further comprising a motor control center that includes the safety distribution unit, the section, and the safety bus.

17. The industrial device assembly of claim 16, wherein:
the one or more industrial automation devices comprise one or more starters, one or more drives, one or more electric motors, or a combination thereof, and
the safety device comprises a proximity switch, an emergency stop pushbutton, a safety mats, a light curtain, or a combination thereof.

18. The industrial device assembly of claim 15, wherein the safety distribution unit is configured to provide short-circuit detection and diagnostics.

19. An industrial device assembly, comprising:
a housing comprising:
- a first section comprising one or more first units, wherein each of the one or more first units comprises one or more industrial automation devices;
- a second section comprising one or more second units, wherein each of the one or more second units comprises one or more second industrial automation devices;

a safety distribution unit configured to:
- communicatively couple to a safety device external to the industrial device assembly, wherein the safety device is configured to detect a presence of a person in an industrial automation system and output one or more safety signals indicative of the presence of the person; and
- receive the one or more safety signals from the safety device; and a safety bus comprising:
- a first terminal block communicatively coupled to the safety distribution unit and configured to receive the one or more safety signals from the safety distribution unit;
- a second terminal block communicatively coupled to the first terminal block and included in the first section, wherein the second terminal block is configured to:
  - receive the one or more safety signals from the first terminal block; and
  - deliver the one or more safety signals to each unit of the one or more first units; and
- a third terminal block communicatively coupled to the second terminal block and included in the second section, wherein the third terminal block is configured to:
  - receive the one or more safety signals from the second terminal block; and
  - deliver the one or more safety signals to each unit of the one or more second units.

20. The industrial device assembly of claim 19, wherein the industrial device assembly comprises a motor control center that includes the housing.

* * * * *